US011556364B2

(12) United States Patent
Faynberg et al.

(10) Patent No.: US 11,556,364 B2
(45) Date of Patent: Jan. 17, 2023

(54) METHOD AND APPARATUS FOR ENABLING PUBLIC KEY INFRASTRUCTURE IN THE GENERIC CLOUD ENVIRONMENT AND THE NETWORK FUNCTION

(71) Applicant: CABLE TELEVISION LABORATORIES, INC., Louisville, CO (US)

(72) Inventors: Igor Faynberg, East Brunswick, NJ (US); Steven J. Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 541 days.

(21) Appl. No.: 16/576,630

(22) Filed: Sep. 19, 2019

(65) Prior Publication Data
US 2020/0097315 A1 Mar. 26, 2020

Related U.S. Application Data

(60) Provisional application No. 62/734,107, filed on Sep. 20, 2018.

(51) Int. Cl.
*G06F 9/455* (2018.01)
*H04L 9/32* (2006.01)
(Continued)

(52) U.S. Cl.
CPC ........ *G06F 9/45558* (2013.01); *H04L 9/0877* (2013.01); *H04L 9/0894* (2013.01);
(Continued)

(58) Field of Classification Search
CPC ....... G06F 9/45558; G06F 2009/45587; H04L 9/0877; H04L 9/0894; H04L 9/3234; H04L 9/3263; H04L 9/006; H04L 9/0897
See application file for complete search history.

(56) References Cited

U.S. PATENT DOCUMENTS

| 2004/0268142 A1* | 12/2004 | Karjala | H04L 63/0272 726/15 |
| 2009/0077376 A1* | 3/2009 | Montagut | G06F 21/62 713/176 |

(Continued)

*Primary Examiner* — Robert B Leung
*Assistant Examiner* — Bruce S Ashley
(74) *Attorney, Agent, or Firm* — David Daniel Smith

(57) ABSTRACT

Methods, systems, and devices for enabling public key infrastructure (PKI) in the generic could environment and the network function virtualization (NFV) environment. A host device may receive, from an orchestrator of a computer network environment, an indication of a workload to be executed by a virtual machine (VM) hosted on the host device, where the indication includes an identifier of the workload. The VM may transmit a request for a certificate to a hardware security module associated with the host device including the identifier of the workload. After transmitting the request for the certificate, the VM may receive the requested certificate from the HSM. In some cases, the VM may determine a private key associated with the workload and include the private key within the request for the certificate. Additionally or alternatively, the HSM may determine the private key. Here, the HSM may include the private key within the certificate.

21 Claims, 10 Drawing Sheets

(51) Int. Cl.
*H04L 9/08* (2006.01)
*H04L 9/00* (2022.01)

(52) U.S. Cl.
CPC .......... *H04L 9/3234* (2013.01); *H04L 9/3263* (2013.01); *G06F 2009/45587* (2013.01); *H04L 9/006* (2013.01)

(56) References Cited

U.S. PATENT DOCUMENTS

| | | | |
|---|---|---|---|
| 2011/0131448 A1* | 6/2011 | Vasil | G06F 9/546 718/1 |
| 2016/0028551 A1* | 1/2016 | Hussain | G06F 21/335 713/156 |
| 2018/0137261 A1* | 5/2018 | Lattin | H04W 4/70 |
| 2020/0042675 A1* | 2/2020 | Asanghanwa | H04L 63/123 |

* cited by examiner

METHOD AND APPARATUS FOR ENABLING PUBLIC KEY INFRASTRUCTURE IN THE GENERIC CLOUD ENVIRONMENT AND THE NETWORK FUNCTION

CROSS REFERENCES

The present Applications for patent claims the benefit of U.S. Provisional Patent Application No. 62/734,107 by Faynberg et al., entitled "METHOD AND APPARATUS FOR ENABLING THE PUBLIC KEY INFRASTRUCTURE IN THE GENERIC CLOUD AND THE NETWORK FUNCTION VIRTUALIZATION ENVIRONMENT USING THE HSM NETWORKS," filed Sep. 20, 2018, assigned to the assignee hereof, and expressly incorporated herein by reference in its entirety.

BACKGROUND

The field of the disclosure relates generally to management of computer networks, and more particularly, to enabling public key infrastructure (PKI) in the generic cloud environment and the network function virtualization (NFV) environment.

The rapidly-growing complexity of NFV requires an infrastructure scaled to the demand for availability. Conventional NFV infrastructures often employ hardware roots of trust that aim to establish a tamper-resistant "black box" that use built-in cryptographic keys to perform cryptographic operations, such as encryption, decryption, and hashing. Examples of such hardware roots of trust include the Trusted Platform Module (TPM) and the Hardware Security Module (HSM). These trust models/schemes are used for remote attestation, with the attestation being typically performed by a third party and/or a Cloud services user. It may be desirable to enable PKI infrastructure in generic cloud environments where the hardware roots may be variable.

SUMMARY

The present disclosure relates to methods, systems, devices, and apparatuses that enable public key infrastructure (PKI) in the generic cloud environment and the network function virtualization (NFV) environment. Generally, the described techniques provide for establishing a credentials for a workload to be executed on a virtual machine (VM). The credentials may then be applied in a host agnostic manner (e.g., when the workload moves from being executed at a first VM to a second VM hosted on a different host device). A host device may receive, from an orchestrator of a computer network environment, an indication of a workload (e.g., including a workload identifier) to be executed by a virtual machine hosted on the host device. Based on receiving the workload identifier, the host device (e.g., a hypervisor of the host device) may allocate resources for the VM.

The host device may have a pre-existing secure association with a hardware security module (HSM). The VM may communicate a request for a certificate to the HSM for VM authentication and attestation. The VM may include the workload identifier in the request for the certificate. The HSM may receive the request and compare the workload identifier within the request to a workload identifier received from the orchestrator (e.g., within an indication of the workload). The HSM may perform a certification function based on the workload identifiers being the same, generate a certificate for the VM, and communicate the certificate to the VM.

A method is described. The method may include receiving, at a host device from an orchestrator of a computer network environment, an indication of a workload to be executed by a VM hosted on the host device, the indication including an identifier of the workload, generating a secure execution environment for the VM within a trusted platform module (TPM) of the host device based on receiving the identifier of the workload, determining, at the VM, a private key associated with the workload based on the identifier of the workload, and transmitting, to an HSM, a request for a certificate to authenticate communication associated with the workload, where the request includes a public key associated with the workload, the private key, and the identifier of the workload.

An apparatus is described. The apparatus may include a processor, memory in electronic communication with the processor, and instructions stored in the memory. The instructions may be executable by the processor to cause the apparatus to receive, at a host device from an orchestrator of a computer network environment, an indication of a workload to be executed by a VM hosted on the host device, the indication including an identifier of the workload, generate a secure execution environment for the VM within a TPM of the host device based on receiving the identifier of the workload, determine, at the VM, a private key associated with the workload based on the identifier of the workload, and transmit, to an HSM, a request for a certificate to authenticate communication associated with the workload, where the request includes a public key associated with the workload, the private key, and the identifier of the workload.

Another apparatus is described. The apparatus may include means for receiving, at a host device from an orchestrator of a computer network environment, an indication of a workload to be executed by a VM hosted on the host device, the indication including an identifier of the workload, means for generating a secure execution environment for the VM within a TPM of the host device based on receiving the identifier of the workload, means for determining, at the VM, a private key associated with the workload based on the identifier of the workload, and means for transmitting, to an HSM, a request for a certificate to authenticate communication associated with the workload, where the request includes a public key associated with the workload, the private key, and the identifier of the workload.

A non-transitory computer-readable medium storing code is described. The code may include instructions executable by a processor to receive, at a host device from an orchestrator of a computer network environment, an indication of a workload to be executed by a VM hosted on the host device, the indication including an identifier of the workload, generate a secure execution environment for the VM within a TPM of the host device based on receiving the identifier of the workload, determine, at the VM, a private key associated with the workload based on the identifier of the workload, and transmit, to an HSM, a request for a certificate to authenticate communication associated with the workload, where the request includes a public key associated with the workload, the private key, and the identifier of the workload.

Some examples of the method, apparatuses, and non-transitory computer-readable medium described herein may further include operations, features, means, or instructions for receiving, from the HSM, the requested certificate including the public key associated with the workload.

Some examples of the method, apparatuses, and non-transitory computer-readable medium described herein may further include operations, features, means, or instructions for applying, at the VM, the certificate for communicating a message with a participant within the computer network environment, where an association between the message and the VM may be verifiable according to the certificate, the identity of the workload, and one or more of the public key associated with the workload or the private key associated with the workload.

Some examples of the method, apparatuses, and non-transitory computer-readable medium described herein may further include operations, features, means, or instructions for generating, within the secure execution environment for the VM, the private key associated with the workload, where the determining the private key may be based on the generating.

Some examples of the method, apparatuses, and non-transitory computer-readable medium described herein may further include operations, features, means, or instructions for transmitting, to the HSM, one or more parameters corresponding to a type of the certificate requested by the VM.

Some examples of the method, apparatuses, and non-transitory computer-readable medium described herein may further include operations, features, means, or instructions for receiving, from the HSM in response to transmitting the request for the certificate, an error message based on the one or more parameters transmitted to the HSM.

Some examples of the method, apparatuses, and non-transitory computer-readable medium described herein may further include operations, features, means, or instructions for establishing a secure association between the VM and the HSM based on a secure association between the TPM and the HSM, where transmitting the request for the certificate may be based on establishing the secure associating between the VM and the HSM.

Some examples of the method, apparatuses, and non-transitory computer-readable medium described herein may further include operations, features, means, or instructions for authenticating, by the VM, the HSM based on a public key associated with the HSM, where establishing the secure association with the HSM may be based on the authenticating.

Some examples of the method, apparatuses, and non-transitory computer-readable medium described herein may further include operations, features, means, or instructions for transmitting a message to the HSM including a certificate authority to validate the HSM according to the public key associated with the HSM, where the authenticating the HSM may be based on a response to transmitting the message.

A method is described. The method may include receiving, at a host device from an orchestrator of a computer network environment, an indication a workload to be executed by a VM hosted on the host device, the indication including an identifier of the workload, establishing a secure association between an HSM and the VM based on authenticating the HSM using a public key associated with the HSM and known by the host device, transmitting, to the HSM, a request for a certificate to authenticate communication associated with the workload, where the request includes the identifier of the workload, and receiving, from the HSM, the requested certificate including a public key associated with the workload and a private key associated with the workload.

An apparatus is described. The apparatus may include a processor, memory in electronic communication with the processor, and instructions stored in the memory. The instructions may be executable by the processor to cause the apparatus to receive, at a host device from an orchestrator of a computer network environment, an indication a workload to be executed by a VM hosted on the host device, the indication including an identifier of the workload, establish a secure association between an HSM and the VM based on authenticating the HSM using a public key associated with the HSM and known by the host device, transmit, to the HSM, a request for a certificate to authenticate communication associated with the workload, where the request includes the identifier of the workload, and receive, from the HSM, the requested certificate including a public key associated with the workload and a private key associated with the workload.

Another apparatus is described. The apparatus may include means for receiving, at a host device from an orchestrator of a computer network environment, an indication a workload to be executed by a VM hosted on the host device, the indication including an identifier of the workload, means for establishing a secure association between an HSM and the VM based on authenticating the HSM using a public key associated with the HSM and known by the host device, means for transmitting, to the HSM, a request for a certificate to authenticate communication associated with the workload, where the request includes the identifier of the workload, and means for receiving, from the HSM, the requested certificate including a public key associated with the workload and a private key associated with the workload.

A non-transitory computer-readable medium storing code is described. The code may include instructions executable by a processor to receive, at a host device from an orchestrator of a computer network environment, an indication a workload to be executed by a VM hosted on the host device, the indication including an identifier of the workload, establish a secure association between an HSM and the VM based on authenticating the HSM using a public key associated with the HSM and known by the host device, transmit, to the HSM, a request for a certificate to authenticate communication associated with the workload, where the request includes the identifier of the workload, and receive, from the HSM, the requested certificate including a public key associated with the workload and a private key associated with the workload.

Some examples of the method, apparatuses, and non-transitory computer-readable medium described herein may further include operations, features, means, or instructions for transmitting a parameter to the HSM indicating, to the HSM, to determine the private key associated with the workload, where receiving the private key associated with the workload may be based on transmitting the parameter to the HSM.

Some examples of the method, apparatuses, and non-transitory computer-readable medium described herein may further include operations, features, means, or instructions for generating a secure execution environment for the VM within a TPM of the host device based on receiving the identifier of the workload and prior to transmitting the request for the certificate, and storing the private key associated with the workload at the secure execution environment.

Some examples of the method, apparatuses, and non-transitory computer-readable medium described herein may further include operations, features, means, or instructions for establishing a secure association between the VM and the HSM based on a secure association between the TPM and the HSM, where transmitting the request for the certificate may be based on establishing the secure associating between the VM and the HSM.

DETAILED DESCRIPTION

Figure 1:
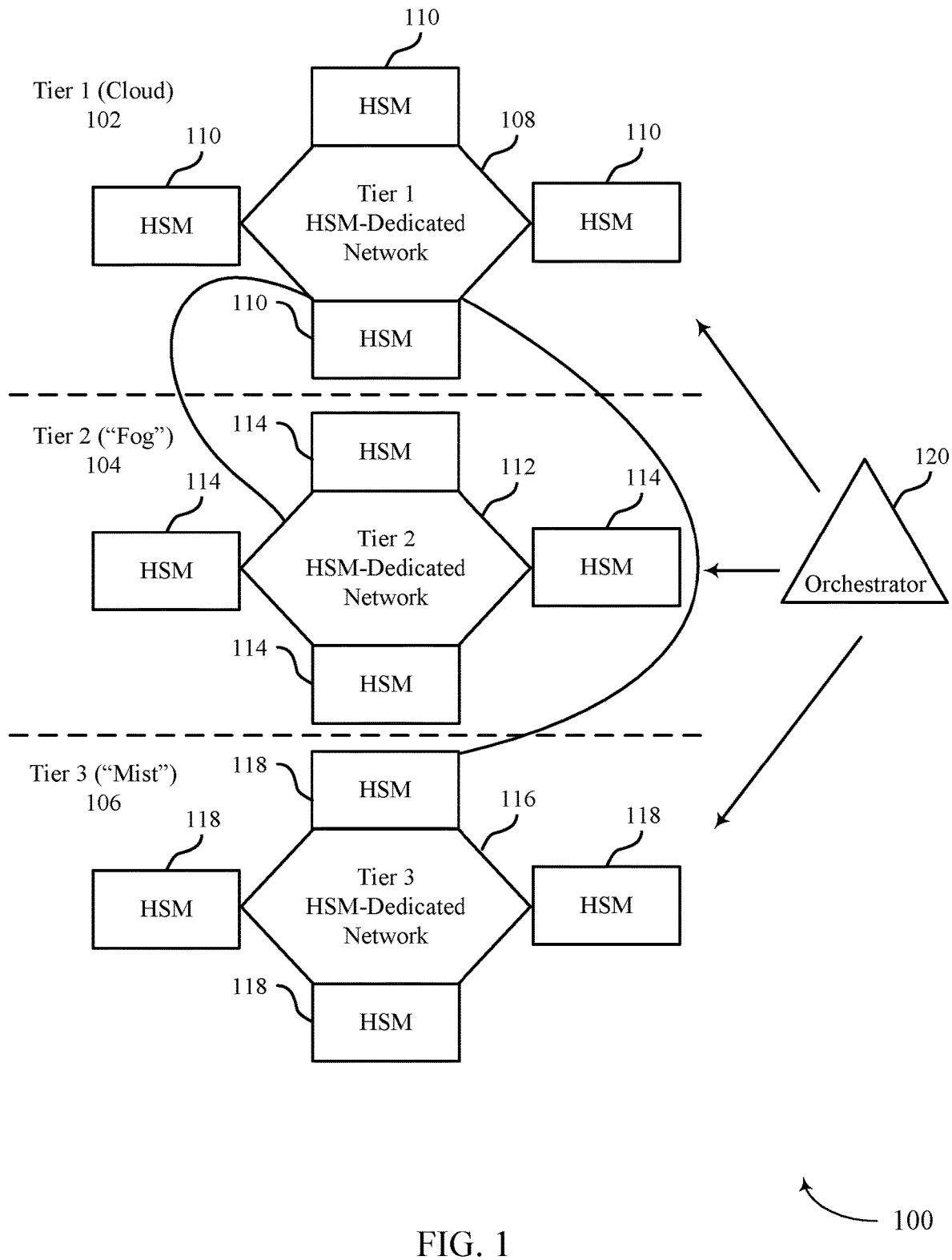
FIG. 1 illustrates an example of a hardware security module (HSM) system for enabling public key infrastructure (PKI) in the generic cloud environment and the network function virtualization (NFV) environment in accordance with examples as disclosed herein.

In some computer network environments that support public key infrastructure (PKI), a certification (e.g., an established credential) for a virtual machine (VM) configured to execute a workload may be based on a host device hosting the VM. For example, an identify of the VM may be invariable tied to a trusted platform module (TPM) of the host device. A hardware security module (HSM) configured to maintain a secure association with the VM may maintain the secure association and issue a certificate based on the VM identity tied to the TPM. In a case that the computer network environment includes a network of HSMs utilizing, for example, the cloud and network function virtualization (NFV) environments, a VM configured to execute a workload may move from one host device to another. It may be desirable to establish credentials for the VM in a manner that is verifiable for participants in the NFV environment.

An orchestrator of the computer network environment (e.g., a managing entity of the computer network environment) may identify a workload to be performed by a VM. The orchestrator may select a host device to host the VM and determine an HSM currently associated with the host device (e.g., an HSM with a currently established secure association with the host device). The orchestrator may, based on that determination, transmit an indication of the workload to the host device and the HSM. The indication may include a workload identifier (e.g., a VM identifier). When the host device receives the workload identifier, the host device may allocate resources for the VM. In some cases, the allocated resources for the VM may include resources within the TPM. Thus, the VM may have access to a secure execution environment.

In order to receive the credentials necessary for the VM to execute its associated workload, the VM may transmit a request for a certificate to the HSM. The VM may include its workload identifier within the request for the certificate. The HSM may receive the request and determine to grant the VM a certificate based on determining that the workload identifier included within the request is the same as the workload identifier received from the orchestrator (e.g., within the indication of the workload). The HSM may transmit the requested certificate to the VM, thus establishing the credentials of the VM. If the VM transfers to a different host device (e.g., and a different HSM), the credentials of the VM may also transfer within network of HSMs.

The VM may utilize a private key associated with the workload to communicate messages with other participants of the computer network environment. If the VM has a secure execution environment (e.g., a soft TPM within the TPM resources of the host device), the VM may generate the private key associated with the workload. Here, the VM may include the private key in the request for the certificate transmitted to the HSM. In some other cases, the HSM may generate the private key. Here, the HSM may communicate the private key to the VM within the certificate. In either case, the VM may use the private key or a public key associated with the workload to communicate messages with the other participants of the computer network environment.

Features of the disclosure are initially described in the context of HSM or NFV systems as described with reference to FIGS. 1 and 2. Features of the disclosure are described in the context of process flows and an NFV system as described with reference to FIGS. 3-5. These and other features of the disclosure are further illustrated by and described with reference to an apparatus diagram and flowcharts that relate to method and apparatus for enabling PKI in the generic cloud environment and the NFV environment as described with references to FIGS. 6-10.

FIG. 1 illustrates and example of a multi-tier HSM system 100 that supports enabling PKI in the generic could environment and the NFV environment in accordance with various aspects of the present disclosure. In the exemplary embodiment, multi-tier HSM system 100 includes a first tier 102, a second tier 104, and a third tier 106. In the exemplary embodiment, first tier 102 represents the Cloud computing environment, second tier 104 represents the "Fog" computing environment (sometimes referred to as "edge computing"), and third tier 106 represents the "Mist" computing environment. In some embodiments, the Cloud includes a centralized processor, the Fog includes decentralized processing, and the Mist includes lightweight and/or local computer processing.

In an embodiment, first tier 102 includes at least one tier-1 HSM-dedicated network 108 having one or more tier-1 HSMs 110, second tier 104 includes at least one tier-2 HSM-dedicated network 112 having one or more tier-2 HSMs 114, and third tier 106 includes at least one tier-3 HSM-dedicated network 116 having one or more tier-3 HSMs 118. In the exemplary embodiment each of HSM-dedicated networks 108, 112, 116 are in operable communication with a system orchestrator 120, which may be a cloud orchestrator or an NFV orchestrator, and may include an OpenStack Neutron Engine. In this example, fog tier 104 and mist tier 106 are configured such that the relevant computations are removed physically close to end-point IoT devices (not shown) operable within system 100.

In exemplary operation of system 100, significant improvements to safe networking among the several HSMs are achieved according to the exemplary system layout illustrated in FIG. 1. In the exemplary embodiment illustrated, a physically separated and high-security system network is depicted by way of example for simplicity of explanation, but is not intended to be limiting. The physically-separate, high-security embodiment is selected in FIG. 1 as an example effective storage access and establishment of command-and-control networking among Cloud orchestration and management principals. Other exemplary embodiments include, without limitation, virtual private networks having multiple layers, and implementation of the present techniques among the multiple layers thereof.

The exemplary embodiment depicted in FIG. 1 represents a clustering effect based on the natural geographic (or similar) relationship of modules to each other, and/or to other devices (e.g. other internet-of-things (IoT) devices). In this example, the separated HSM-dedicated networks 108, 112, 116 are depicted among different tiers as a specialized case tailored to a specific situation allowing cost minimization and speed maximization of the particular network of this exemplary embodiment. For example, in this instance, one or more of tier 2 HSM-dedicated network 112 and tier 3 HSM-dedicated network 116 may be Local Area Networks (LANs). Nevertheless, the specific hardware architecture of the present systems and methods is not limited to this particular multi-tier specialized network structure to enable the credential migration among different modules.

For example, in an alternative embodiment, a particular HSM-dedicated network may include and utilize a smaller segregated subset of HSMs within a single HSM-dedicated network. In some embodiments, such segregated subsets may be dictated by special security considerations, such as those dictated by law enforcement and/or regulatory agencies. In at least one embodiment, special security considerations may be implemented and managed according to a particular service-level agreement with a Cloud consumer.

HSM system 100 may achieve both within an individual network/tier, or across the tiers, of the multi-tier architecture: (i) improved capability for high transmission, and commensurate with the performance requirements imposed by the number of HSMs 110, 112, 116 operating within system 100, as well as the number of transactions performed within a relevant (e.g., predetermined) unit of time; (ii) protection from external interference that can cause degradation of the transmission capabilities of system 100; and (iii) protection from eavesdropping.

In some embodiments, eavesdropping protection is achieved by dedicating the respective network for use only by desired entities, operators, or devices. In other embodiments, eavesdropping protection is achieved using (i) communication protocols (e.g., IPSec, TLS, etc.) that guarantee confidentiality, integrity, and protection from replays, and (ii) the introduction of random "noise" by continuous interchanges among randomly selected pairs of individual HSMs that simulate transactions. These techniques represented particular improvements to traffic security by preventing a potential eavesdropper from determining an actual credential distribution of system 100 by analyzing the traffic therein. In at least one embodiment, the amount of random noise introduced is predetermined, such that the generated noise is in compliance with performance requirements of system 100 when the performance requirements are being established. In other embodiments, the amount of noise can be dynamically adjusted according to changing performance requirements in real-time, or to scale system 100 to increasing need. In one embodiment, eavesdropping protection is achieved through the alternative, or supplemental, utilization of full-time dedicated encryption techniques.

That is, because the respective HSMs establish tamper-resistant or tamper-proof platforms, HSMs 110, 114, 118 may advantageously store the related PKI keys to implement within the HSM platform itself, the physically-separate and high-security network example depicted in FIG. 1. According to this improved architecture, dedicated point-to-point encrypted connections may be established between HSMs, as a layer1 link, using the keys stored within the respective HSM. In an exemplary embodiment, each such established connection between HSMs uses unique keys or at least one unique key pair (e.g., a public key, a private key). The relatively tamper-proof nature of the respective HSMs is thus sufficient to ensure that any unauthorized effort to access the keys or related links will trigger the relevant tamper-resistant mechanism(s) of the HSM. Through this improved system architecture, system 100 advantageously realizes the same security for the entirety of the networked HSMs 110, 114, 118 as would be realized for an individual HSM.

According to an exemplary embodiment, system 100 is advantageously capable of successfully enabling the migration of credentials associated with a particular VM such that the migrated credentials reside in the HSMs/modules that are optimal for access from the particular VMs as the VMs themselves are migrated. That is, in system 100, credentials are optimally migrated between modules within a particular HSM network, among modules in different networks in the same tier, and/or between modules of networks in different tiers.

The present migration techniques are therefore further advantageously capable of being implemented as an alternative to, or in a complementary manner with, out-of-band, that is, "manual," migration of credentials. In an exemplary embodiment, migration is managed and/or performed by system orchestrator 120, which is the entity tasked with making the relevant decisions and directing the VM placement. In order to instantiate VMs in a way that is attestable within a NFV environment, and that can migrate from one host to a second host, it may be desirable to also establish credentials for the VM configured to execute the workload in a way that can move as well.

The orchestrator 120 may identify a workload to be performed by the VM and select a host device to host the VM. The orchestrator 120 may, based on that determination, transmit an indication of the workload to the host device and the associated HSM. The indication may include a workload identifier (e.g., a VM identifier). When the host device receives the workload identifier, the host device may allocate resources for the VM. In some cases, the allocated resources for the VM may include resources within the TPM. Thus, the VM may have access to a secure execution environment.

In order to receive the credentials necessary for the VM to execute its associated workload, the VM may transmit a request for a certificate to the HSM. The VM may include its workload identifier within the request for the certificate. The HSM may receive the request and determine to grant the VM a certificate based on determining that the workload identifier included within the request is the same as the workload identifier received from the orchestrator 120 (e.g., within the indication of the workload). The HSM may transmit the requested certificate to the VM, thus establishing the credentials of the VM. If the VM transfers to a different host device (e.g., and a different HSM), the credentials of the VM may also transfer by a network of HSMs.

The VM may utilize a private key associated with the workload to communicate messages with other participants of the computer network environment. If the VM has a secure execution environment (e.g., a soft TPM within the TPM resources of the host device), the VM may generate the private key associated with the workload. Here, the VM may include the private key in the request for the certificate transmitted to the HSM. In some other cases, the HSM may generate the private key. Here, the HSM may communicate the private key to the VM within the certificate. In either case, the VM may use the private key or a public key associated with the workload to communicate messages with the other participants of the computer network environment.

Figure 2:
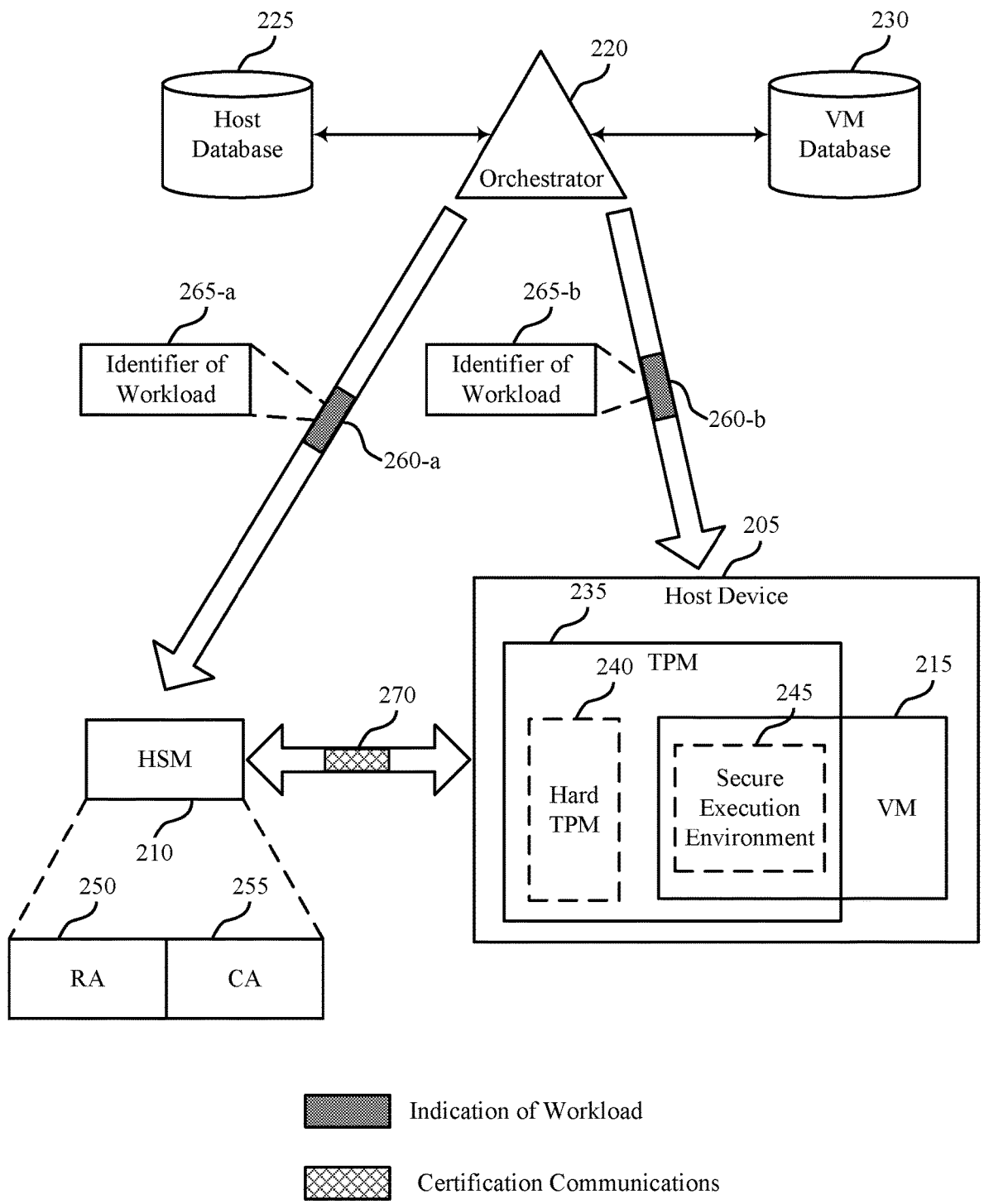
FIG. 2 illustrates an example of a system that supports enabling PKI in the generic cloud environment and the NFV environment in accordance with examples as disclosed herein.

FIG. 2 illustrates an example of a system 200 that supports enabling PKI in the generic could environment and the NFV environment in accordance with various aspects of the present disclosure. System 200 may implement aspects of HSM system 100. For example, System 200 may include HSM 210, which may include aspects of an HSM as described with reference to FIG. 1. Further, System 200 may include orchestrator 220, which may be an example of orchestrator 120 as described with reference to FIG. 1. The System 200 may also include a host database 225, a VM database 230, a host device 205, and a VM 215. As described above, the VM may be established such that if the VM 215 migrates from HSM 210 to a different HSM, the credentials associated with the VM 215 (e.g., the credentials associated with the workload associated with the VM 215) may also migrate.

The orchestrator 220 may be in communication with host database 225 and VM database 230. The host database 225 may include data related to multiple different host devices 205 within the System 200. For example, each host device 205 may be indexed by a unique host identifier. The host database 225 may further bind attributes related to each host device 205 to the unique host identifier. For example, an orchestrator may determine a geographic location of a host device 205 from the host database 225 and a state of the host device 205. In some cases, the host database 225 may also indicate an HSM 210 associated with each host device 205. That is, the host device 205 may have a secure association established with an HSM 210 (e.g., based on a geographic location of the host device 205 and the HSM 210) and the host database 225 may indicate the HSM 210 associated with each host device 205. The orchestrator 220 may also be in communication with the VM database 230. The VM database 230 may include information related to a life cycle of each VM 215. In some cases, the orchestrator 220 may reference a VM 215 based on an identifier of a workload 265 being executed by a VM. In some cases, the host database 225 and the VM database 230 may be integrated into a single database.

When the orchestrator 220 determines to initiate a workload, the orchestrator 220 may determine a host device 205 to host a VM 215 configured to initiate the workload by referencing the host database 230 to determine a host device 205 available to host the VM 215. The orchestrator 220 may store a VM identifier (e.g., an identifier of the workload 265) at the VM database 225 based on determining a host device 205 to host the VM 215. The orchestrator 220 may also update a state of the identified host device 205 to indicate that the host device 205 is associated with the VM 215.

The orchestrator may communicate an indication of the workload 260-b to the identified host device 205 and the indication of the workload 260-a to the HSM 210 associated with the host device 205. Each indication of the workload 260 may include the identifier of the workload 265. When the host device 205 receives the indication of the workload 260-b, the host device 205 may allocate resources for the VM 215 (e.g., instantiate the VM 215). In some cases, the host device 205 may include a TPM 235. The host device 205 may allocate resources for the VM 215 within the TPM 235. This may create a secure execution environment 245 for the VM 215. In some cases, a portion of the TPM 235 that is not allocated to the VM 215 may be referred to as the hard TPM 240 while the secure execution environment 245 for the VM 215 may be referred to as a soft TPM. The host device 205 may include a hypervisor to manage the virtualization of the VM 215 using the hardware associated with the host device 205. The hypervisor may also be referred to as a virtualization layer.

Upon instantiating the VM 215 at the host device 205, the VM 215 may begin exchanging one or more certification communications 270 with the HSM 210 to gain a certificate from the HSM 210. For example, a first message within the certification communications 270 may include the VM 215 transmitting a request for a certificate to the HSM 210. The request for the certificate may include the identifier of the workload 265. The HSM 210 may compare the identifier of the workload 260-b (e.g., received within the request for the certificate) to the identifier of the workload 260-a received from the orchestrator 220. The request for the certificate may also include one or more parameters associated with a type of certificate being requested by the VM 215. In some other cases, the request for the certificate may also include a public key associated with the workload and a private key associated with the workload (e.g., public/private key pair).

If the HSM 210 determines that a certificate should be generated for the VM 215 (e.g., if the identifiers of the workload 265-a and 265-b match and the parameters associated with the type of requested certificate are valid), the HSM 210 may transmit, as part of the certification communications 270, the requested certificate to the VM 215. In some cases, the HSM 210 may include a registration authority (RA) 250 and/or a certification authority (CA) 255 to grant the certificate and to register the VM 215 as certified. Additionally or alternatively, the HSM 210 may communicate with one or more other devices within the system 200 including the RA 250 and the CA 255.

The VM 215 may receive the indication of the workload 260-b and, in some cases, determine to generate a private key associated with the workload. For example, system 200 may utilize cryptographic operations to secure communications between participant devices within the system 200. For example, messages transmitted to the VM 215 may be encrypted by a public key, while messages received by the VM 215 may be decrypted by the private key. If the VM 215 has access to the secure execution environment 245, the VM 215 may store the private key within the secure execution environment 245. Additionally or alternatively, the VM 215 may rely on the HSM 210 to determine and store the private key. Here, the VM 215 may route all messages through the HSM 210 to be decrypted by the private key. This may maintain the security of the communications within the HSM network as the association between the host device 205 and HSM 210 is previously secured.

If the VM 215 has access to a secure execution environment 245, the VM 215 may generate the private key within the secure execution environment 245 and store the private key within the secure execution environment 245. Here, the VM 215 may include the private key within the request for the certificate transmitted from the VM 215 to the HSM 210. Upon receiving the private key, the HSM 210 may store the private key. Thus, if the VM 215 is migrated to a different host device 205 (and a different HSM 210), the HSM network may know the private key associated with the workload executed by the VM 215. In some cases, the HSM 210 may not store the private key. For example, if the private key is to be used for a short period of time, the HSM 210 may not store the private key.

Alternatively, the VM 215 may not have access to the secure execution environment 245. For example, the host device 205 may not have a TPM 235. In another example, the host device 205 may have a TPM 235 but may not allocate resources within the TPM 235 to the VM 215. In another example, the VM 215 may have access to the secure execution environment 245 for a short period of time, or may not be able to reproduce the secure execution environment 245 in a different host device 205 (e.g., if the VM 215 is migrated). If a VM 215 does not generate the private key within the secure execution environment 245, the VM 215 may indicate, to the HSM 210, for the HSM 210 to determine the private key (e.g., within the request for the certificate). If the HSM 210 receives the indication to determine the private key, the HSM 210 may generate the private key for the workload and store the private key at the HSM 210. The HSM 210 may, optionally, transmit the private key to the VM 215 for storage (e.g., if the VM 215 has access to the secure execution environment 245).

If the VM 215 migrates to a different host device 205, the certifications may be maintained (e.g., by the network of HSMs and by the RA 350 and CA 355) and the private and public keys may also still be available. For example, the private and public keys may be stored within the HSM network).

Figure 3:
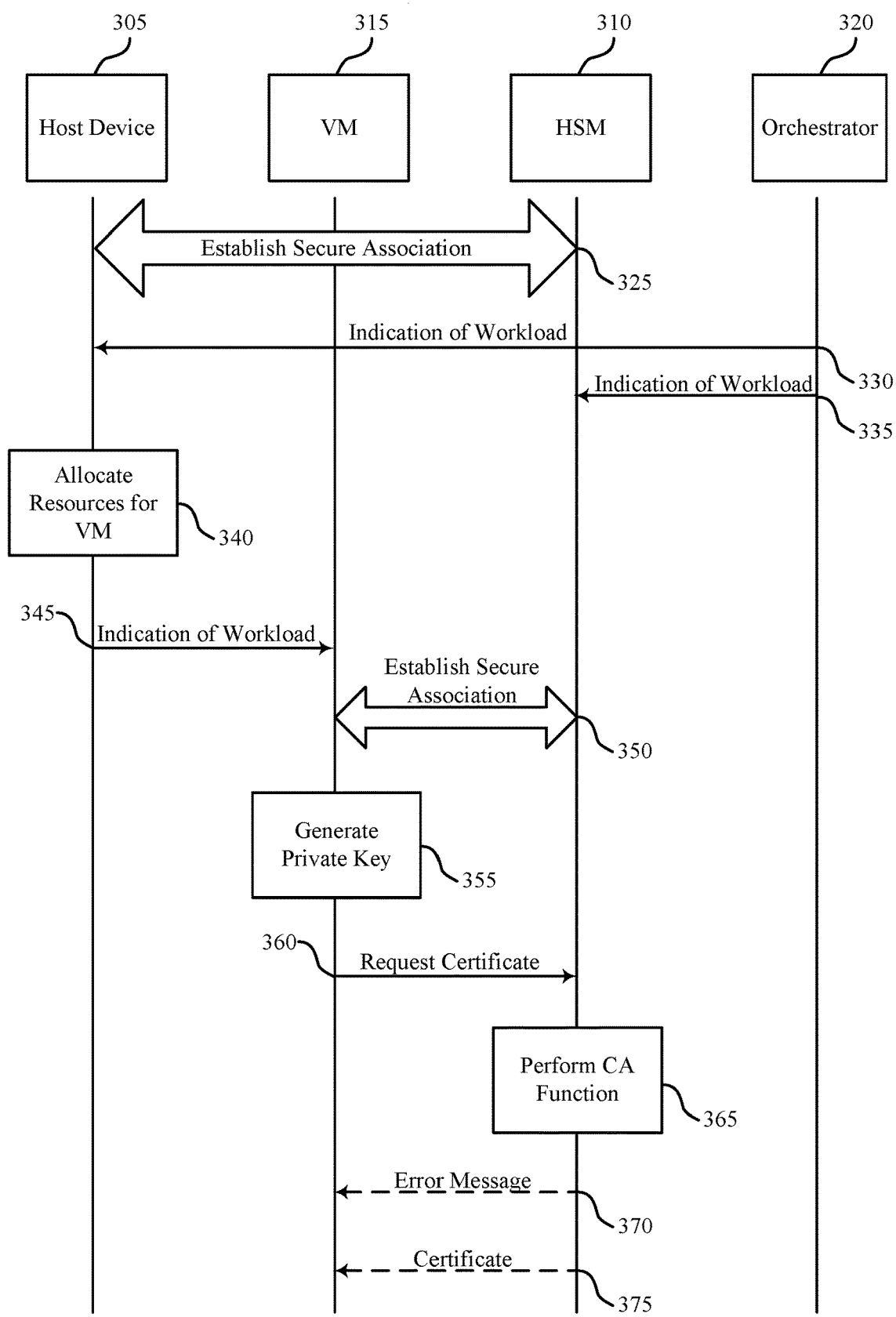
FIGS. 3 and 4 illustrate example process flows that support enabling PKI in the generic cloud environment and the NFV environment in accordance with examples as disclosed herein.

FIG. 3 illustrates an example of a process flow 300 that supports enabling PKI in the generic could environment and the NFV environment in accordance with various aspects of the present disclosure. The process flow 300 may support aspects of the systems 100 and 200 as described with reference to FIGS. 1 and 2. For example, the process flow 300 may include communications between a host device 305, a VM 315, an HSM 310, and an orchestrator 320, which may be examples of the corresponding devices as describe with reference to FIGS. 1 and 2. In the following description of the process flow 300, the operations performed by the host device 305, the VM 315, the HSM 310, and the orchestrator 320 may be performed in different orders or at different times. Some operations may also be omitted from the process flow 300, and other operations may be added to the process flow 300.

At 325, the HSM 310 and the host device 305 may establish a secure association with each other. For example, the HSM 310 and the host device 305 may establish a secure association based at least in part on private and public keys associated with the host device 305.

At 330, the orchestrator 320 may transmit an indication of a workload to the host device 305. At 335, the orchestrator may additionally transmit the indication of the workload to the HSM 310. The indication of the workload may include an identifier of the workload.

At 340, the host device 305 may allocate resources for the VM 315 based on receiving the indication of the workload. For example, the workload may be executed by a VM 315 to be hosted on the host device 305. In some cases, the allocated resources for the VM may include resources within the TPM. Thus, the VM may have access to a secure execution environment.

At 345, the host device 305 may indicate the workload to the VM 315. The indication may include the workload identifier. In some cases, the workload identifier may also identify the VM 315.

At 350, the VM 315 may establish a secure association with the HSM 310. In some cases, the secure association with the HSM 310 may be based on the secure association between the host device 305 and the HSM 310 (e.g., established at 325). The secure association may be established based on the VM 315 authenticating a certificate associated with the host device 305 (e.g., via HSM 310). The VM 315 may authenticate the certificate using a public key associated with the host device 305 or the HSM 310. The HSM 310 may authenticate the VM 315 using a public key associated with the host device 305. That is the secure association between the VM 315 and the HSM 310 may be derived from the secure association between the host device 305 and the HSM 310 (e.g., established at 325).

At 355, the VM 315 may generate a private key. That is, the VM 315 may generate the private key within the secure execution environment and store the private key within the secure execution environment. The VM 315 may also generate a public key associated with the workload (e.g., public/private key pair).

At 360, the VM 315 may transmit a request for a certificate to the HSM 310. The request for the certificate may include the identifier of the workload. The request for the certificate may be protected and authenticated using the secure association between the host device 305 and the HSM 310 (e.g., established at 325). For example, the request for the certificate may be encrypted according to a public key associated with the host device 305. In some cases, the VM 315 may include the private key within the request for the certificate transmitted from the VM 315 to the HSM 310. Upon receiving the private key, the HSM 310 may store the private key. Thus, if the VM 315 is migrated to a different host device 305 (and a different HSM 310), the HSM network may know the private key associated with the workload executed by the VM 315. In some cases, the HSM 310 may not store the private key. For example, if the private key is to be used for a short period of time, the HSM 310 may not store the private key. The request for the certificate may also include the public key or parameters corresponding to a type of certificate requested by the VM 315.

At 365, the HSM 310 may perform a CA function. That is, the HSM 310 may first determine whether the certificate should be generated for the VM 315 in response to the request for the certificate. For example, the HSM 310 may determine if the identifier of the workload received within the VM 315 within the request for the certificate matches the identifier of the workload received from the orchestrator 320. Additionally or alternatively, the HSM 310 may determine if the parameters associated with the type of requested certificate are valid. As part of the CA function, the HSM 310 may utilize an RA or a CA to grant the requested certificate and/or register the requested certificate.

At 370, the HSM 310 may optionally transmit an error message. For example, if the HSM 310 determines that the parameters included within the request for the certificate are not valid, the HSM 310 may transmit the error message. Additionally or alternatively, if the identifier of the workload received within the VM 315 within the request for the certificate does not match the identifier of the workload received from the orchestrator 320, the HSM 310 may transmit the error message.

Alternatively to transmitting the error message, the HSM 310 may transmit the requested certificate to the VM 315 at 375. For example, if the HSM 310 determines that the parameters included within the request are valid and the identifier of the workload received within the VM 315 within the request for the certificate matches the identifier of the workload received from the orchestrator 320, the HSM 310 may transmit the certificate. The certificate may include the public key and/or the private key associated with the workload. The VM 315 may apply the certificate for communicating a message with a participant within the computer network environment, where an association between the message and the VM 315 is verifiable according to the certificate, the identity of the workload, and one or more of the public key associated with the workload or the private key associated with the workload.

Figure 4:
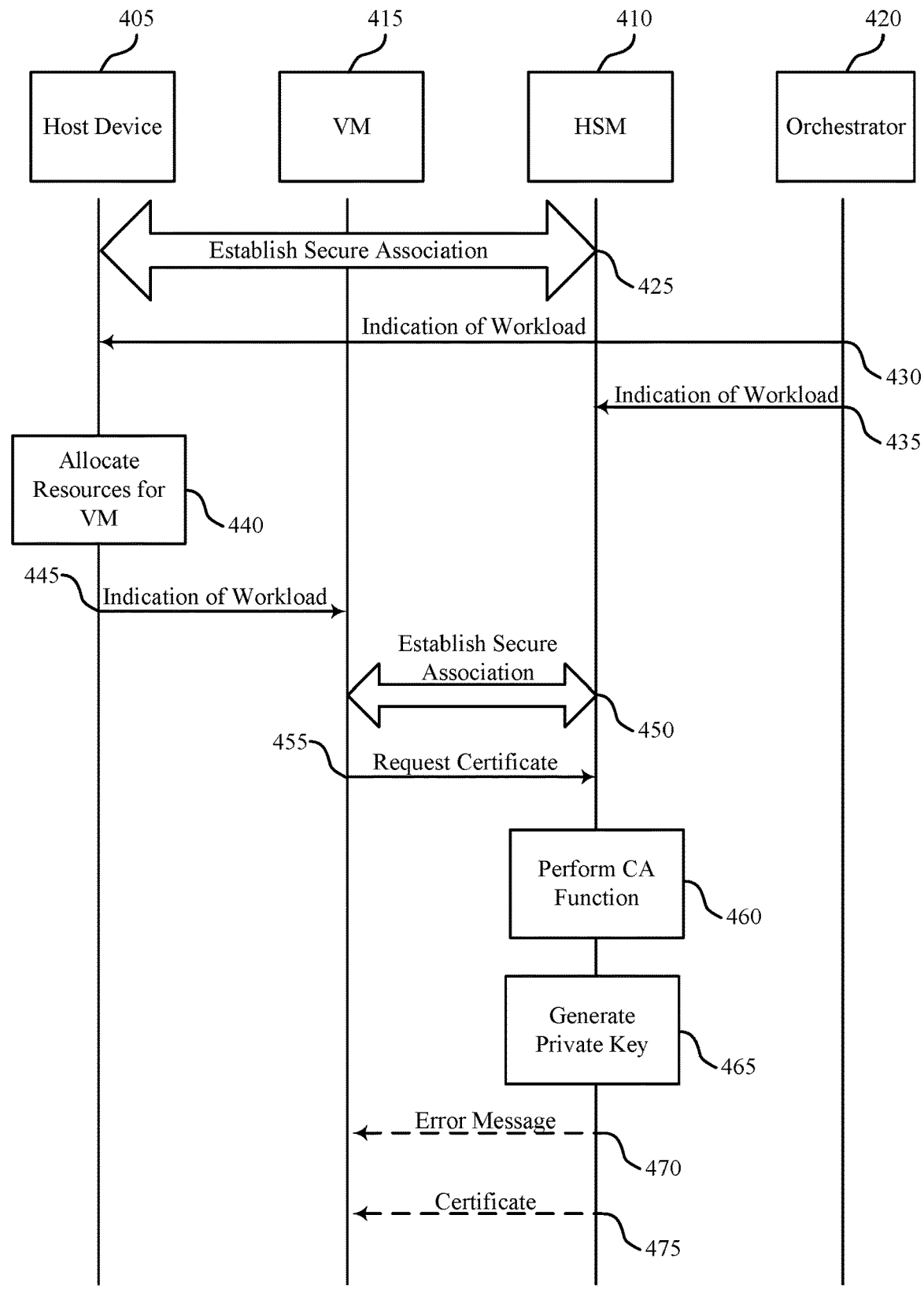

FIG. 4 illustrates an example of a process flow 400 that supports enabling PKI in the generic cloud environment and the NFV environment in accordance with various aspects of the present disclosure. The process flow 400 may support aspects of the Systems 100 and 200 as described with reference to FIGS. 1 and 2. For example, the process flow 400 may include communications between a host device 405, a VM 415, an HSM 410, and an orchestrator 420, which may be examples of the corresponding devices as describe with reference to FIGS. 1 and 2. In the following description of the process flow 400, the operations performed by the host device 405, the VM 415, the HSM 410, and the orchestrator 420 may be performed in different orders or at different times. Some operations may also be omitted from the process flow 400, and other operations may be added to the process flow 400.

At 425, the HSM 410 and the host device 405 may establish a secure association with each other. For example, the HSM 410 and the host device 405 may establish a secure association based at least in part on private and public keys associated with the host device 405.

At 430, the orchestrator 420 may transmit an indication of a workload to the host device 405. At 435, the orchestrator may additionally transmit the indication of the workload to the HSM 410. The indication of the workload may include an identifier of the workload.

At 440, the host device 405 may allocate resources for the VM 415 based on receiving the indication of the workload. For example, the workload may be executed by a VM 415 to be hosted on the host device 405. The resources may or may not include a secure execution environment (e.g., within the TPM of the host device). For example, the host device 405 may not have a TPM. In another example, the host device 405 may have a TPM but may not allocate resources within the TPM to the VM 415. In another example, the VM 415 may have access to the secure execution environment for a short period of time, or may not be able to reproduce the secure execution environment in a different host device 405 (e.g., if the VM 415 is migrated).

At 445, the host device 405 may instantiate the VM 415 for the workload. The instantiation may associate the VM with the workload identifier (e.g., the workload identifier may identify the VM 415).

At 450, the VM 415 may establish a secure association 445 with the HSM 410. In some cases, the secure association 445 with the HSM 410 may be based on the secure association 425 between the host device 405 and the HSM 410. The secure association 445 may be established based on the VM 415 authenticating the host device 405. The VM 415 may authenticate the host device 405 using a certificate or public key associated with the host device 405. The HSM 410 may authenticate the VM 415 using a public key associated with the workload being executed by the VM 415 (e.g., VM identifier, workload identifier).

At 455, the VM 415 may transmit a request for a certificate to the HSM 410. The request for the certificate may include the identifier of the workload. In some cases, the VM 415 may include a parameter indicating to the HSM 415 to determine the private key. The request for the certificate may also include parameters corresponding to a type of certificate requested by the VM 415. The request for the certificate may be protected and authenticated using the secure association between the host device 405 and the HSM 410 (e.g., established at 425). For example, the request for the certificate may be encrypted according to a public key associated with the host device 405.

At 460, the HSM 410 may perform a CA function. That is, the HSM 410 may first determine whether the certificate should be generated for the VM 415 in response to the request for the certificate. For example, the HSM 410 may determine if the identifier of the workload received within the VM 415 within the request for the certificate matches the identifier of the workload received from the orchestrator 420. Additionally or alternatively, the HSM 410 may determine if the parameters associated with the type of requested certificate are valid. As part of the CA function, the HSM 410 may utilize an RA or a CA to grant the requested certificate and/or register the requested certificate.

At 465, the HSM 410 may generate a private key associated with the workload. For example, if the HSM 410 receives the indication to determine the private key, the HSM 410 may generate the private key for the workload and store the private key at the HSM 410. Thus, if the VM 415 is migrated to a different host device 405 (and a different HSM 410), the HSM network may know the private key associated with the workload executed by the VM 415. In some cases, the HSM 410 may not store the private key. For example, if the private key is to be used for a short period of time, the HSM 410 may not store the private key. The HSM may also generate a public key associated with the VM 415 (e.g., public/private key pair).

At 470, the HSM 410 may optionally transmit an error message. For example, if the HSM 410 determines that the parameters included within the request for the certificate are not valid, the HSM 410 may transmit the error message. Additionally or alternatively, if the identifier of the workload received within the VM 415 within the request for the certificate does not match the identifier of the workload received from the orchestrator 420, the HSM 410 may transmit the error message.

Alternatively to transmitting the error message, the HSM 410 may transmit the requested certificate to the VM 415 at 475. For example, if the HSM 410 determines that the parameters included within the request are valid and the identifier of the workload received within the VM 415 within the request for the certificate matches the identifier of the workload received from the orchestrator 420, the HSM 415 may transmit the certificate. The certificate may include the public key associated with the workload. The certificate may also include the private key to be stored at the VM 415 (e.g., if the VM 415 has access to the secure execution environment).

The VM 415 may apply the certificate for communicating a message with a participant within the computer network environment, where an association between the message and the VM 415 is verifiable according to the certificate, the identity of the workload, and one or more of the public key associated with the workload or the private key associated with the workload. In some cases, the VM 415 may route messages through the HSM 410. For example, the VM 415 may not store a private key associated with the workload. Thus, the HSM 415 may decode messages relating to the workload using the private key stored at the HSM 415 and communicate the messages to the VM 415 by the secure association 450.

Figure 5:
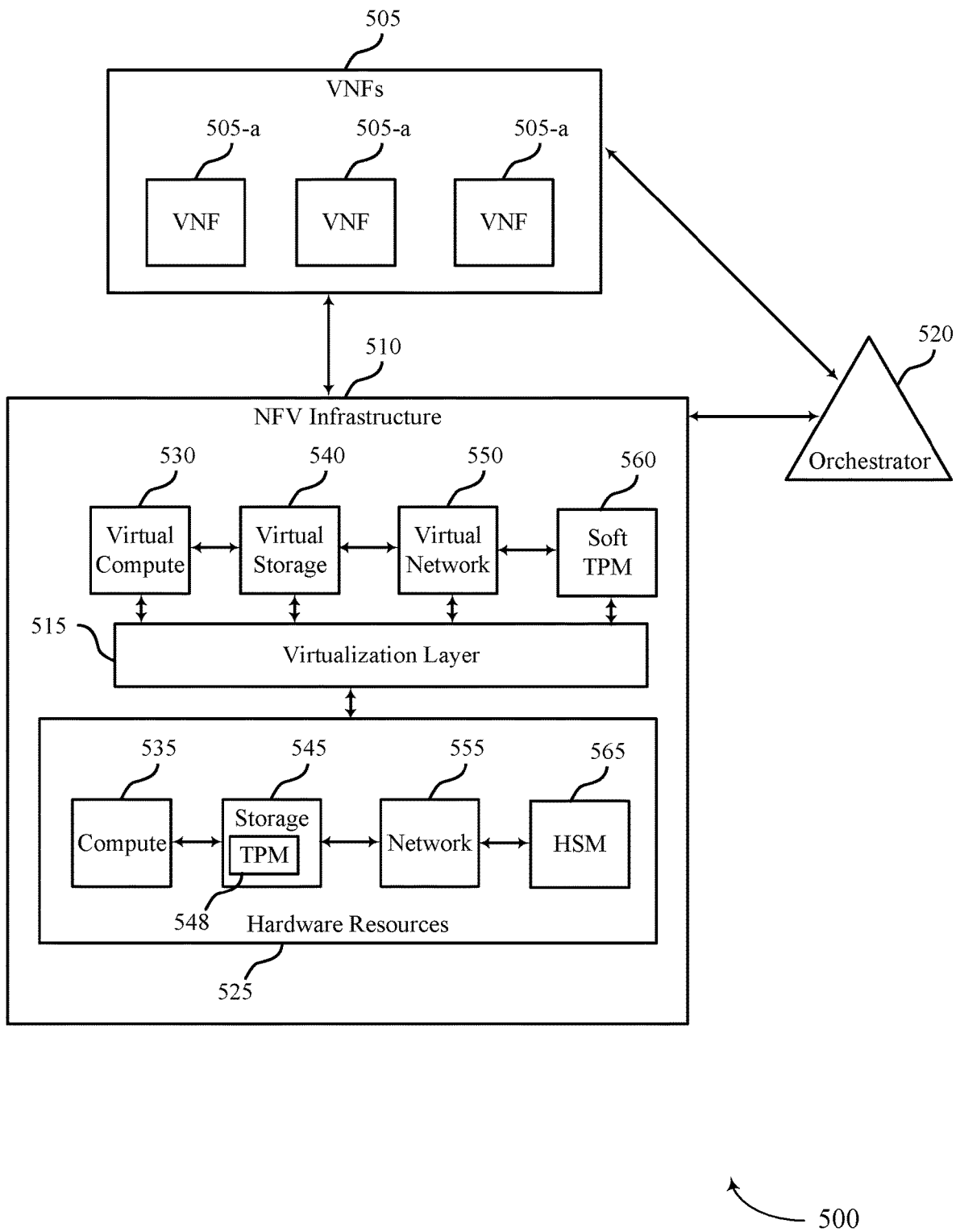
FIG. 5 illustrates an example of an NFV system that supports enabling PKI in the generic cloud environment and the NFV environment in accordance with examples as disclosed herein.

FIG. 5 illustrates an example of an NFV system 500 that supports enabling PKI in the generic could environment and the NFV environment in accordance with various aspects of the present disclosure. For example, a virtual network function (VNF) 505 may be an example of a workload to be executed by a VM as described with reference to FIGS. 1-4. Further, the orchestrator 520 may be an example of an orchestrator as described with reference to FIGS. 1-4. In some cases, the NFV infrastructure 510 may illustrate a relationship between a host device and a VM as described with reference to FIGS. 1-4. NFV infrastructure 510 may include virtual components, a virtualization layer 515, and hardware resources 525.

The NFV system 500 may operate networking services. In some cases, many networking services may be coupled to a hardware appliance. In the case of NFV system 500, many functions of the NFV system 500 (e.g., VNFs 505) may be decoupled form a hardware appliance and may instead operate by running in software. As a result, VNFs 505 may run on standardized (e.g., non-function-specific) hardware resources 525. A VM (e.g., as discussed with reference to FIGS. 2-4) may utilize one or more VNFs 505 to operate on standardized hardware resources 525.

The NFV infrastructure 510 may include standardized hardware resources 525 including compute 535, storage 545, network 555, and HSM 565. Storage 545 may include a hard TPM 548 (e.g., a secure execution environment). The NFV infrastructure 510 may include a virtualization layer 515. In some cases, the virtualization layer 515 may be referred to as a hypervisor. The hypervisor may interface with the hardware resources 525 to deliver the virtual components that operate independently of the hardware resources 525. The virtual components may include a virtual compute 530, virtual storage 540, virtual network 550, and soft TPM 560. HSM 565 may store the related PKI keys and may provide RA and CA functions for NFV system 500. Soft TPM 560 may be the virtualized resources provided for a given workload (e.g., a VNF 505) via virtualization layer 515.

Figure 6:
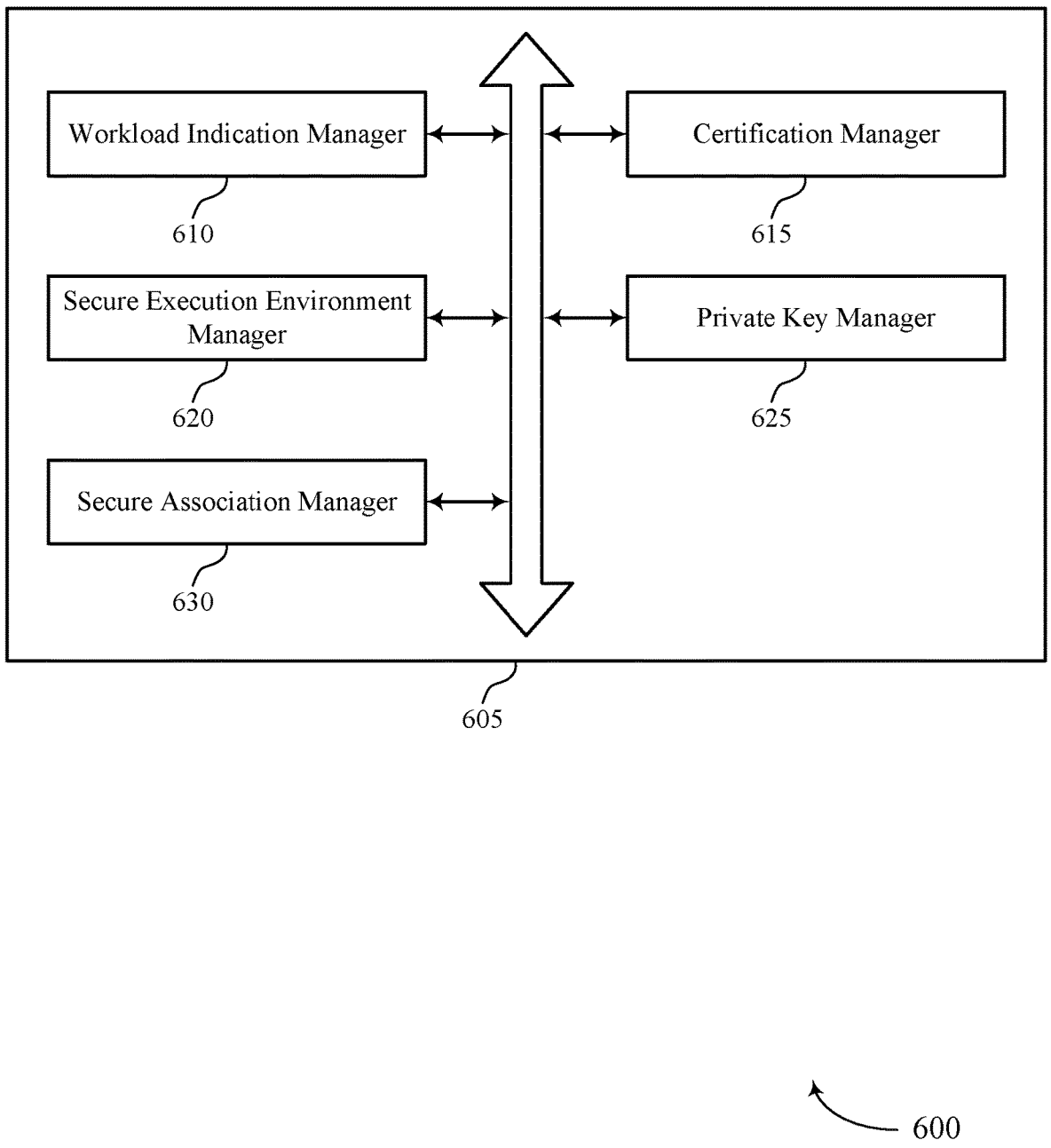
FIG. 6 shows a block diagram of a host device that supports enabling PKI in the generic cloud environment and the NFV environment in accordance with aspects of the present disclosure.

FIG. 6 shows a block diagram 600 of a host device 605 that supports method enabling PKI in the generic cloud environment and the NFV environment in accordance with examples as disclosed herein. The host device 605 may be an example of aspects of a host device as described with reference to FIGS. 2-4. The host device 605 may include a workload indication manager 610, a certification manager 615, a secure execution environment manager 620, a private key manager 625, and a secure association manager 630. Each of these modules may communicate, directly or indirectly, with one another (e.g., via one or more buses).

The workload indication manager 610 may receive, at a host device from an orchestrator of a computer network environment, an indication of a workload to be executed by a VM hosted on the host device, the indication including an identifier of the workload.

The certification manager 615 may transmit, to an HSM, a request for a certificate to authenticate communication associated with the workload. The request may include the identifier of the workload. Additionally or alternatively, the request may include a public key associated with the workload and the private key. In some examples, the certification manager 615 may receive, from the HSM, the requested certificate. The requested certificate may include a public key associated with the workload. Additionally or alternatively, the requested certificate may further include a private key associated with the workload. In some examples, the certification manager 615 may apply, at the VM, the certificate for communicating a message with a participant within the computer network environment, where an association between the message and the VM is verifiable according to the certificate, the identity of the workload, and one or more of the public key associated with the workload or the private key associated with the workload.

In some examples, the certification manager 615 may transmit, to the HSM, one or more parameters corresponding to a type of the certificate requested by the VM. In some examples, the certification manager 615 may transmit a parameter to the HSM indicating, to the HSM, to determine the private key associated with the workload, where receiving the private key associated with the workload is based on transmitting the parameter to the HSM.

The secure execution environment manager 620 may generate a secure execution environment for the VM within a TPM of the host device based on receiving the identifier of the workload. In some examples, the secure execution environment manager 620 may generate a secure execution environment for the VM within a TPM of the host device based on receiving the identifier of the workload and prior to transmitting the request for the certificate.

The private key manager 625 may determine, at the VM, a private key associated with the workload based on the identifier of the workload. In some examples, the private key manager 625 may generate, within the secure execution environment for the VM, the private key associated with the workload, where the determining the private key is based on the generating. In some cases, the private key manager 625 may store the private key associated with the workload at the secure execution environment.

The secure association manager 630 may establish a secure association between an HSM and the VM based on authenticating the HSM using a public key associated with the HSM and known by the host device. In some examples, the secure association manager 630 may establish a secure association between the VM and the HSM based on a secure association between the TPM and the HSM, where transmitting the request for the certificate is based on establishing the secure associating between the VM and the HSM. In some cases, the secure association manager 630 may authenticate, by the VM, the HSM based on a public key associated with the HSM, where establishing the secure association with the HSM is based on the authenticating. In some instances, the secure association manager 630 may transmit a message to the HSM including a certificate authority to validate the HSM according to the public key associated with the HSM, where the authenticating the HSM is based on a response to transmitting the message.

Figure 7:
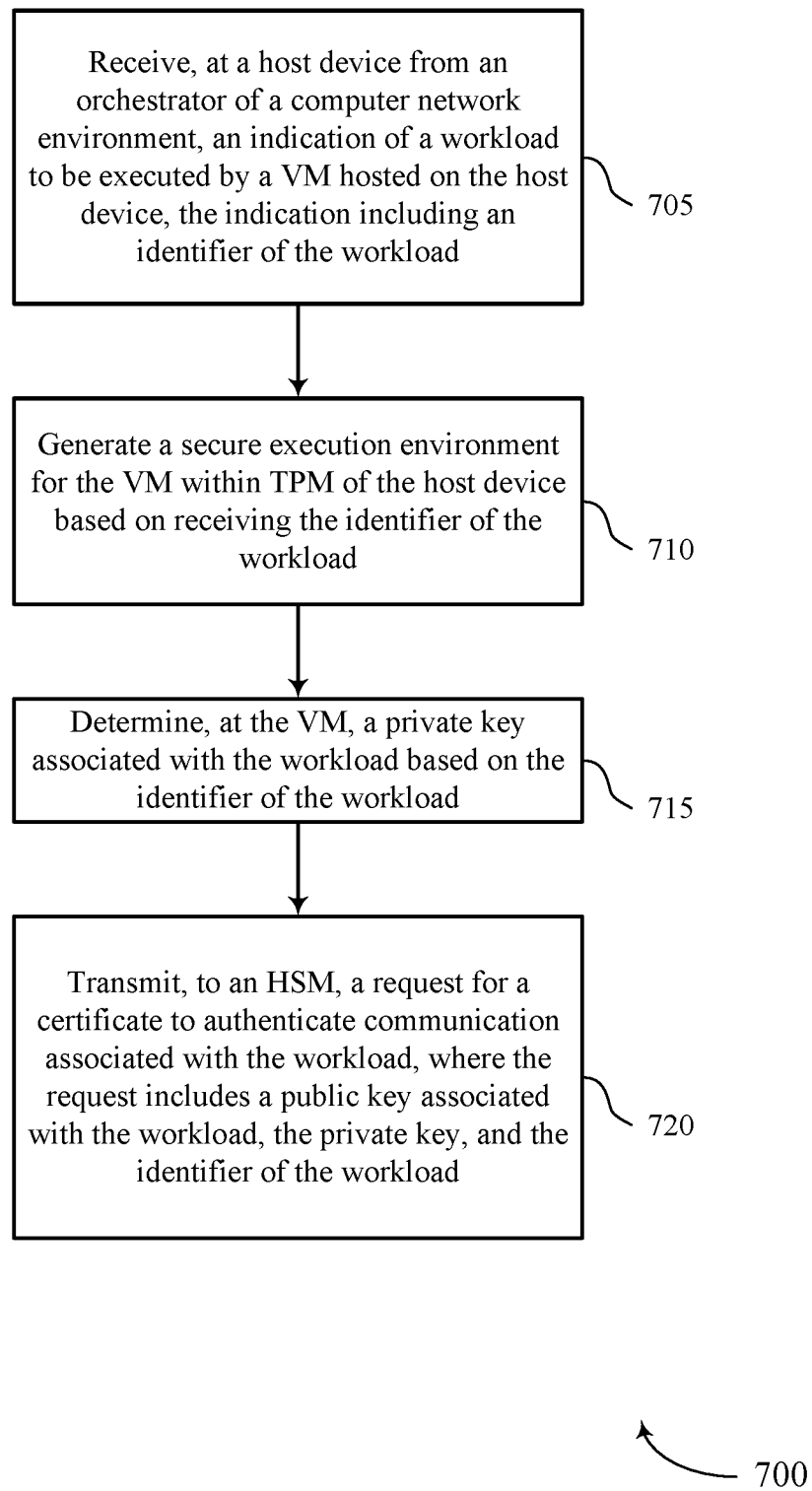
FIGS. 7 through 10 show flowcharts illustrating a method or methods for enabling PKI in the generic cloud environment and the NFV environment in accordance with examples as disclosed herein.

FIG. 7 shows a flowchart illustrating a method or methods 700 for enabling PKI in the generic cloud environment and the NFV environment in accordance with aspects of the present disclosure. The operations of method 700 may be implemented by a host device or its components as described herein. For example, the operations of method 700 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 705, the host device may receive, at a host device from an orchestrator of a computer network environment, an indication of a workload to be executed by a VM hosted on the host device, the indication including an identifier of the workload. The operations of 705 may be performed according to the methods described herein. In some examples, aspects of the operations of 705 may be performed by a workload indication manager as described with reference to FIG. 6.

At 710, the host device may generate a secure execution environment for the VM within a TPM of the host device based on receiving the identifier of the workload. The operations of 710 may be performed according to the methods described herein. In some examples, aspects of the operations of 710 may be performed by a secure execution environment manager as described with reference to FIG. 6.

At 715, the host device may determine, at the VM, a private key associated with the workload based on the identifier of the workload. The operations of 715 may be performed according to the methods described herein. In some examples, aspects of the operations of 715 may be performed by a private key manager as described with reference to FIG. 6.

At 720, the host device may transmit, to an HSM, a request for a certificate to authenticate communication associated with the workload, where the request includes a public key associated with the workload, the private key, and the identifier of the workload. The operations of 720 may be performed according to the methods described herein. In some examples, aspects of the operations of 720 may be performed by a certification manager as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, at a host device from an orchestrator of a computer network environment, an indication of a workload to be executed by a VM hosted on the host device, the indication including an identifier of the workload. The apparatus may further include features, means, or instructions for generating a secure execution environment for the VM within a TPM of the host device based on receiving the identifier of the workload, determining, at the VM, a private key associated with the workload based on the identifier of the workload, and transmitting, to an HSM, a request for a certificate to authenticate communication associated with the workload, where the request includes a public key associated with the workload, the private key, and the identifier of the workload.

Some examples of the method 700 and the apparatus described herein may further include operations, features, means, or instructions for receiving, from the HSM, the requested certificate including the public key associated with the workload.

Some cases of the method 700 and the apparatus described herein may further include operations, features, means, or instructions for applying, at the VM, the certificate for communicating a message with a participant within the computer network environment, where an association between the message and the VM may be verifiable according to the certificate, the identity of the workload, and one or more of the public key associated with the workload or the private key associated with the workload.

Some instances of the method 700 and the apparatus described herein may further include operations, features, means, or instructions for generating, within the secure execution environment for the VM, the private key associated with the workload, where the determining the private key may be based on the generating.

Some examples of the method 700 and the apparatus described herein may further include operations, features, means, or instructions for transmitting, to the HSM, one or more parameters corresponding to a type of the certificate requested by the VM.

Some cases of the method 700 and the apparatus described herein may further include operations, features, means, or instructions for receiving, from the HSM in response to transmitting the request for the certificate, an error message based on the one or more parameters transmitted to the HSM.

Some instances of the method 700 and the apparatus described herein may further include operations, features, means, or instructions for establishing a secure association between the VM and the HSM based on a secure association between the TPM and the HSM, where transmitting the request for the certificate may be based on establishing the secure associating between the VM and the HSM.

Some examples of the method 700 and the apparatus described herein may further include operations, features, means, or instructions for authenticating, by the VM, the HSM based on a public key associated with the HSM, where establishing the secure association with the HSM may be based on the authenticating.

Some cases of the method 700 and the apparatus described herein may further include operations, features, means, or instructions for transmitting a message to the HSM including a certificate authority to validate the HSM according to the public key associated with the HSM, where the authenticating the HSM may be based on a response to transmitting the message.

Figure 8:
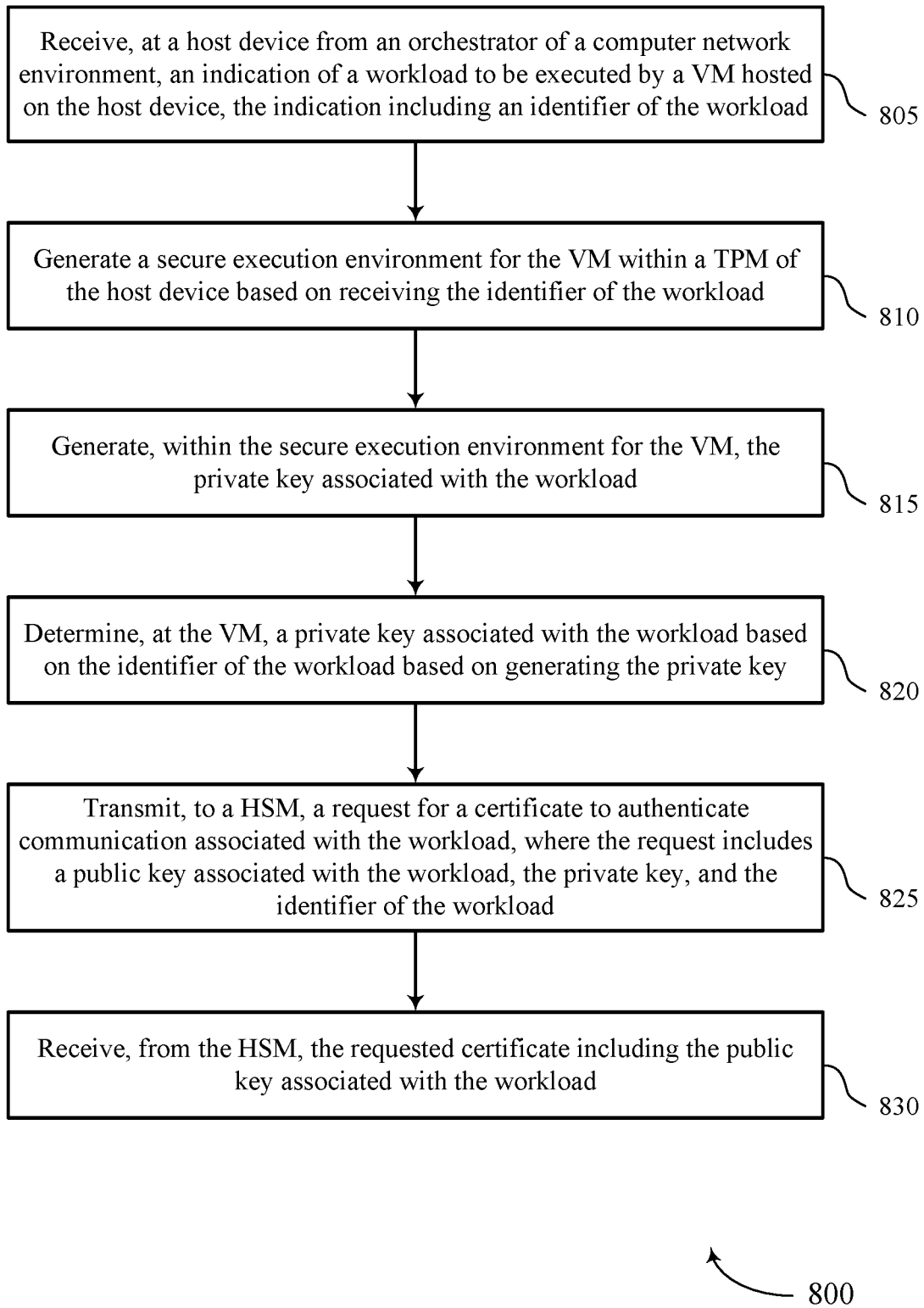

FIG. 8 shows a flowchart illustrating a method or methods 800 that supports method and apparatus for enabling PKI in the generic cloud environment and the NFV environment in accordance with aspects of the present disclosure. The operations of method 800 may be implemented by a host device or its components as described herein. For example, the operations of method 800 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 805, the host device may receive, at a host device from an orchestrator of a computer network environment, an indication of a workload to be executed by a VM hosted on the host device, the indication including an identifier of the workload. The operations of 805 may be performed according to the methods described herein. In some examples, aspects of the operations of 805 may be performed by a workload indication manager as described with reference to FIG. 6.

At 810, the host device may generate a secure execution environment for the VM within a TPM of the host device based on receiving the identifier of the workload. The operations of 810 may be performed according to the methods described herein. In some examples, aspects of the operations of 810 may be performed by a secure execution environment manager as described with reference to FIG. 6.

At 815, the host device may generate, within the secure execution environment for the VM, the private key associated with the workload. The operations of 815 may be performed according to the methods described herein. In some examples, aspects of the operations of 815 may be performed by a private key manager as described with reference to FIG. 6.

At 820, the host device may determine, at the VM, a private key associated with the workload based on the identifier of the workload based on generating the private key. The operations of 820 may be performed according to the methods described herein. In some examples, aspects of the operations of 820 may be performed by a private key manager as described with reference to FIG. 6.

At 825, the host device may transmit, to an HSM, a request for a certificate to authenticate communication associated with the workload, where the request includes a public key associated with the workload, the private key, and the identifier of the workload. The operations of 825 may be performed according to the methods described herein. In some examples, aspects of the operations of 825 may be performed by a certification manager as described with reference to FIG. 6.

At 830, the host device may receive, from the HSM, the requested certificate including the public key associated with the workload. The operations of 830 may be performed according to the methods described herein. In some examples, aspects of the operations of 830 may be performed by a certification manager as described with reference to FIG. 6.

Figure 9:
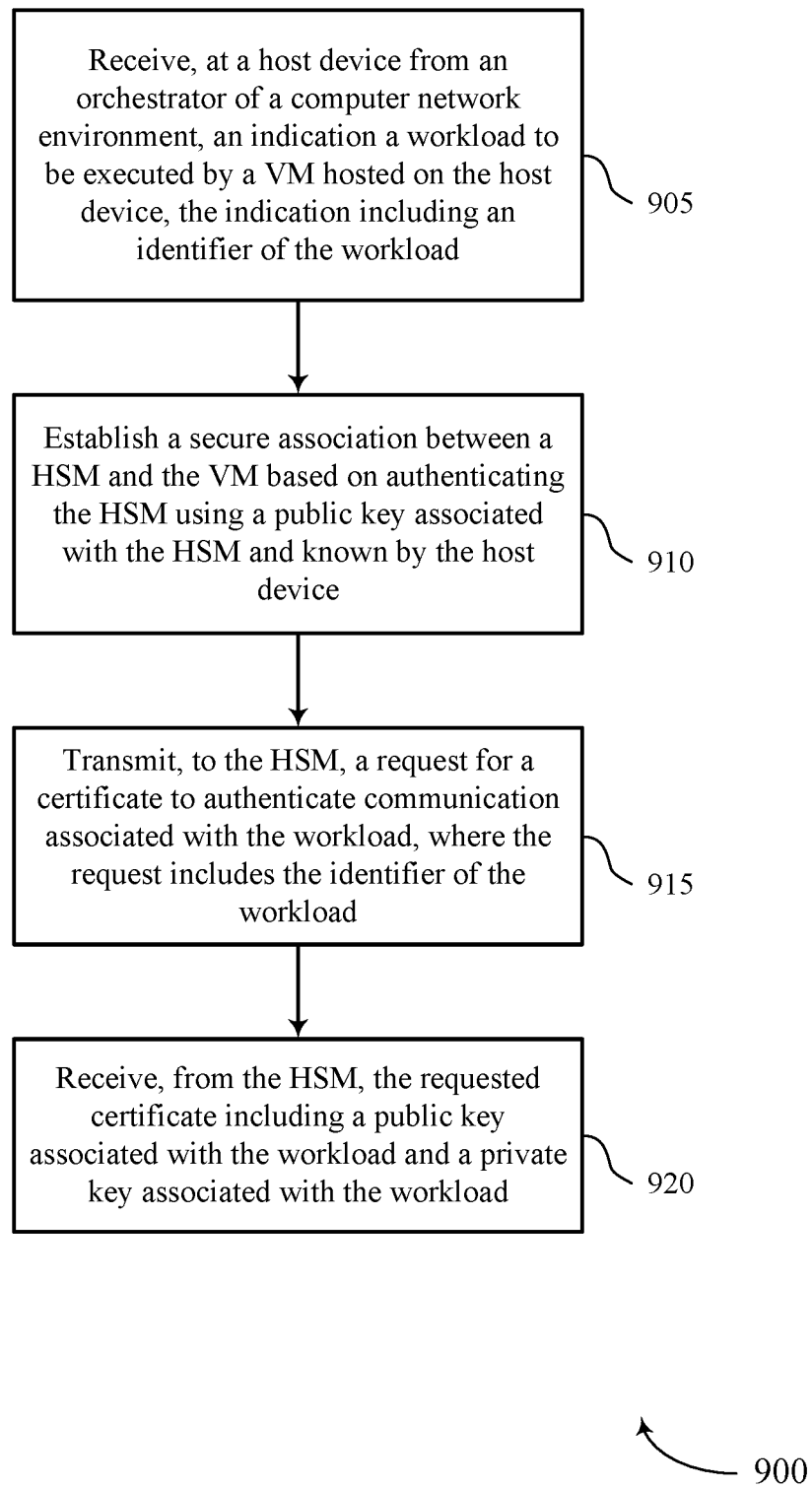

FIG. 9 shows a flowchart illustrating a method or methods 900 that supports method and apparatus for enabling PKI in the generic cloud environment and the NFV environment in accordance with aspects of the present disclosure. The operations of method 900 may be implemented by a host device or its components as described herein. For example, the operations of method 900 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 905, the host device may receive, at a host device from an orchestrator of a computer network environment, an indication a workload to be executed by a VM hosted on the host device, the indication including an identifier of the workload. The operations of 905 may be performed according to the methods described herein. In some examples, aspects of the operations of 905 may be performed by a workload indication manager as described with reference to FIG. 6.

At 910, the host device may establish a secure association between an HSM and the VM based on authenticating the HSM using a public key associated with the HSM and known by the host device. The operations of 910 may be performed according to the methods described herein. In some examples, aspects of the operations of 910 may be performed by a secure association manager as described with reference to FIG. 6.

At 915, the host device may transmit, to the HSM, a request for a certificate to authenticate communication associated with the workload, where the request includes the identifier of the workload. The operations of 915 may be performed according to the methods described herein. In some examples, aspects of the operations of 915 may be performed by a certification manager as described with reference to FIG. 6.

At 920, the host device may receive, from the HSM, the requested certificate including a public key associated with the workload and a private key associated with the workload. The operations of 920 may be performed according to the methods described herein. In some examples, aspects of the operations of 920 may be performed by a certification manager as described with reference to FIG. 6.

In some examples, an apparatus as described herein may perform a method or methods, such as the method 900. The apparatus may include features, means, or instructions (e.g., a non-transitory computer-readable medium storing instructions executable by a processor) for receiving, at a host device from an orchestrator of a computer network environment, an indication a workload to be executed by a VM hosted on the host device, the indication including an identifier of the workload. The apparatus may further include features, means, or instructions for establishing a secure association between an HSM and the VM based on authenticating the HSM using a public key associated with the HSM and known by the host device, transmitting, to the HSM, a request for a certificate to authenticate communication associated with the workload, where the request includes the identifier of the workload, and receiving, from the HSM, the requested certificate including a public key associated with the workload and a private key associated with the workload.

Some examples of the method 900 and the apparatus described herein may further include operations, features, means, or instructions for transmitting a parameter to the HSM indicating, to the HSM, to determine the private key associated with the workload, where receiving the private key associated with the workload may be based on transmitting the parameter to the HSM.

Some cases of the method 900 and the apparatus described herein may further include operations, features, means, or instructions for generating a secure execution environment for the VM within a TPM of the host device based on receiving the identifier of the workload and prior to transmitting the request for the certificate, and storing the private key associated with the workload at the secure execution environment.

Some instances of the method 900 and the apparatus described herein may further include operations, features, means, or instructions for establishing a secure association between the VM and the HSM based on a secure association between the TPM and the HSM, where transmitting the request for the certificate may be based on establishing the secure associating between the VM and the HSM.

Figure 10:
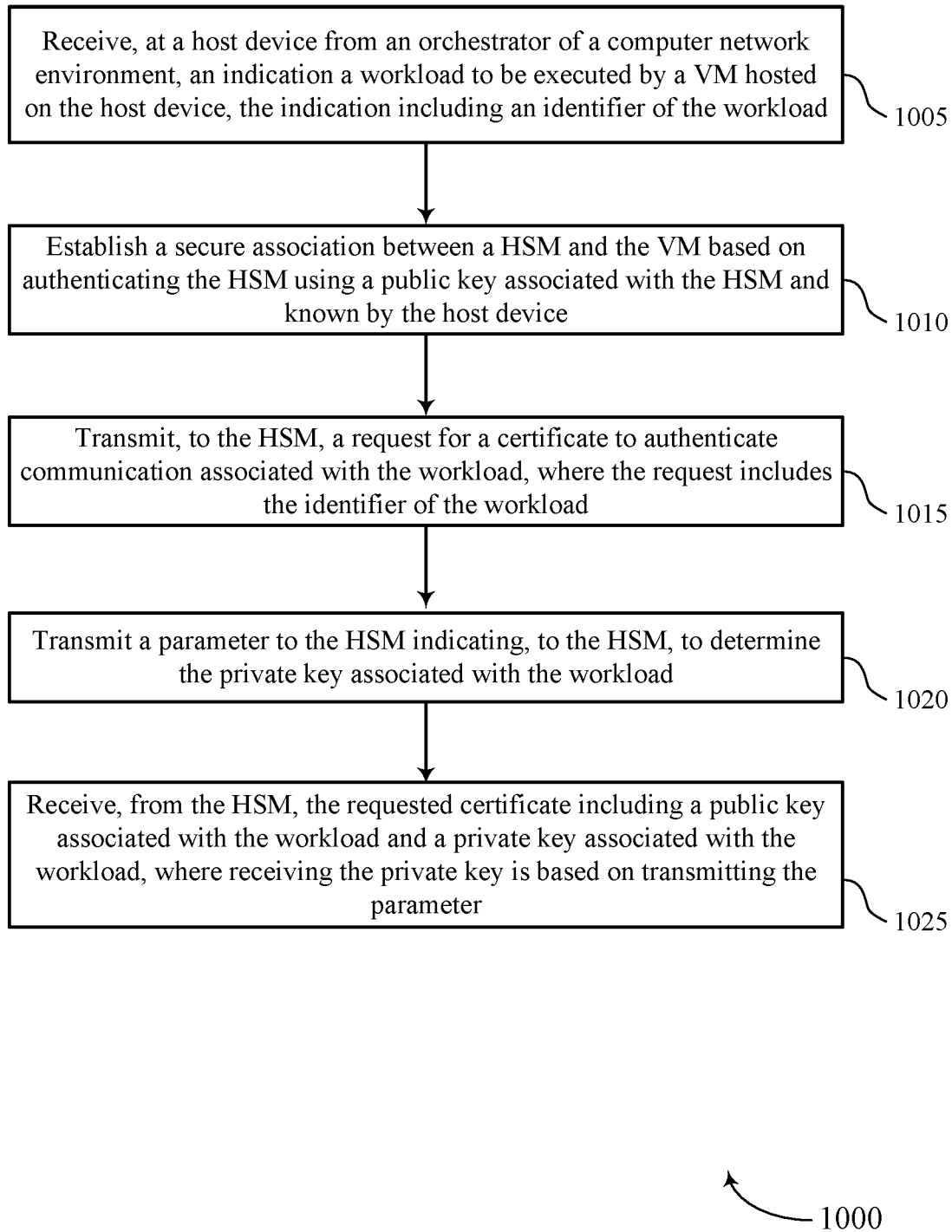

FIG. 10 shows a flowchart illustrating a method or methods 1000 that supports method and apparatus for enabling PKI in the generic cloud environment and the NFV environment in accordance with aspects of the present disclosure. The operations of method 1000 may be implemented by a host device or its components as described herein. For example, the operations of method 1000 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 1005, the host device may receive, at a host device from an orchestrator of a computer network environment, an indication a workload to be executed by a VM hosted on the host device, the indication including an identifier of the workload. The operations of 1005 may be performed according to the methods described herein. In some examples, aspects of the operations of 1005 may be performed by a workload indication manager as described with reference to FIG. 6.

At 1010, the host device may establish a secure association between an HSM and the VM based on authenticating the HSM using a public key associated with the HSM and known by the host device. The operations of 1010 may be performed according to the methods described herein. In some examples, aspects of the operations of 1010 may be performed by a secure association manager as described with reference to FIG. 6.

At 1015, the host device may transmit, to the HSM, a request for a certificate to authenticate communication associated with the workload, where the request includes the identifier of the workload. The operations of 1015 may be performed according to the methods described herein. In some examples, aspects of the operations of 1015 may be performed by a certification manager as described with reference to FIG. 6.

At 1020, the host device may transmit a parameter to the HSM indicating, to the HSM, to determine the private key associated with the workload. The operations of 1020 may be performed according to the methods described herein. In some examples, aspects of the operations of 1020 may be performed by a certification manager as described with reference to FIG. 6.

At 1025, the host device may receive, from the HSM, the requested certificate including a public key associated with the workload and a private key associated with the workload, where receiving the private key associated with the workload is based on transmitting the parameter to the HSM. The operations of 1025 may be performed according to the methods described herein. In some examples, aspects of the operations of 1025 may be performed by a certification manager as described with reference to FIG. 6.

A system is described. The system may include an orchestrator configured to transmit, to a host device and an HSM, an indication of a workload to be executed at a VM linked to the host device, the indication including an identifier of the workload, the host device including a TPM and configured to allocate resources within the host device for the VM based on receiving the identifier of the workload, the VM operating at the host device and configured to communicate a request for a certificate including the identifier of the workload, and the HSM configured to communicate the certificate to the VM based on receiving the identifier of the workload from the VM and the orchestrator.

In some examples, the VM may be further configured to transmit a parameter to the HSM indicating, to the HSM, to determine a private key associated with the workload, and the HSM may be further configured to generate the private key associated with the workload based on the VM transmitting the parameter to the HSM.

In some cases, the VM operates on the allocated resources and independently of the TPM of the host device, and the HSM may be further configured to store the private key associated with the workload based on the VM operating on the allocated resources and independently of the TPM of the host device.

In some instances, the HSM may be further configured to transmit the private key associated with the workload to the VM within the certificate, and the VM may be further configured to store the private key associated with the workload within a secure execution environment based on the allocated resources including the secure execution environment within the TPM of the host device.

In some examples, the host device may be further configured to generate a secure execution environment for the VM within the TPM of the host device based on receiving the identifier of the workload, and the VM may be further configured to determine, within the secure execution environment, a private key associated with the workload based on the identifier of the workload, where the request for the certificate further includes the private key.

In some cases, the VM may be further configured to generate, within the secure execution environment for the VM, the private key associated with the workload, where determining the private key may be based on the generating.

In some instances, the HSM may be further configured to transmit an error message to the VM in response to receiving the request for the certificate based on one or more parameters within the request for the certificate.

In some examples, the host device and the HSM may be configured to establish a secure association between the TPM and the HSM based on a public key associated with the HSM and a private key associated with the HSM, and the VM may be configured to establish a secure association between the VM And the HSM based on the secure association between the TPM and the HSM, where communicating the request for the certificate may be based on the secure association between the VM and the HSM.

It should be noted that the methods described herein are possible implementations, and that the operations and the steps may be rearranged or otherwise modified and that other implementations are possible. Furthermore, portions from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the singular forms "a," "an," and "the" include plural references unless the context clearly dictates otherwise. Also, as used herein, "optional" or "optionally" means that the subsequently described event or circumstance may or may not occur, and that the description includes instances where the event occurs and instances where it does not. Also, as used herein, approximating language, as used herein throughout the specification and claims, may be applied to modify any quantitative representation that could permissibly vary without resulting in a change in the bac function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, at a host device from an orchestrator of a computer network environment, an indication of a workload to be executed by a virtual machine (VM) hosted on the host device, the indication comprising an identifier of the workload;
generating a secure execution environment for the VM within a trusted platform module (TPM) of the host device based at least in part on receiving the identifier of the workload;
determining, at the VM, a private key associated with the workload based at least in part on the identifier of the workload; and
transmitting, from the VM to a hardware security module (HSM), a request for a certificate to authenticate communication associated with the workload to be executed by the VM, wherein the request comprises a public key associated with the workload, the private key, and the identifier of the workload.

2. The method of claim 1, further comprising:
receiving, from the HSM, the requested certificate comprising the public key associated with the workload.

3. The method of claim 2, further comprising:
applying, at the VM, the certificate for communicating a message with a participant within the computer network environment, wherein an association between the message and the VM is verifiable according to the certificate, the identifier of the workload, and one or both of the public key associated with the workload and the private key associated with the workload.

4. The method of claim 1, further comprising:
generating, within the secure execution environment for the VM, the private key associated with the workload, wherein the determining the private key is based at least in part on the generating.

5. The method of claim 1, further comprising:
transmitting, to the HSM, one or more parameters corresponding to a type of the certificate requested by the VM.

6. The method of claim 5, further comprising:
receiving, from the HSM in response to transmitting the request for the certificate, an error message based at least in part on the one or more parameters transmitted to the HSM.

7. The method of claim 1, further comprising:
establishing a secure association between the VM and the HSM based at least in part on a secure associating between the TPM and the HSM, wherein transmitting the request for the certificate is based at least in part on establishing the secure association between the VM and the HSM.

8. The method of claim 7, further comprising:
authenticating, by the VM, the HSM based at least in part on a public key associated with the HSM, wherein establishing the secure association with the HSM is based at least in part on the authenticating.

9. The method of claim 8, further comprising:
transmitting a message to the HSM comprising a certificate authority to validate the HSM according to the public key associated with the HSM, wherein the authenticating the HSM is based at least in part on a response to transmitting the message.

10. A system, comprising:
an orchestrator having a hardware processor and configured to transmit, to a host device and a hardware security module (HSM), an indication of a workload to be executed at a virtual machine (VM) linked to the host device, the indication comprising an identifier of the workload;
the host device comprising a trusted platform module (TPM) and configured to allocate resources within the host device for the VM based at least in part on receiving the identifier of the workload, wherein at least a portion of the allocated resources are within the TPM;
the VM operating at the host device and configured to communicate a request for a certificate to authenticate communication associated with the workload to be executed by the VM, the request comprising the identifier of the workload; and
the HSM configured to communicate the certificate to the VM based at least in part on receiving the identifier of the workload from the VM and the orchestrator.

11. The system of claim 10, wherein:
the VM is further configured to transmit a parameter to the HSM indicating, to the HSM, to determine a private key associated with the workload; and
the HSM is further configured to generate the private key associated with the workload based at least in part on the VM transmitting the parameter to the HSM.

12. The system of claim 11, wherein:
the VM operates on the allocated resources and independently of the TPM of the host device; and
the HSM is further configured to store the private key associated with the workload based at least in part on the VM operating on the allocated resources and independently of the TPM of the host device.

13. The system of claim 11, wherein:
the HSM is further configured to transmit the private key associated with the workload to the VM within the certificate; and
the VM is further configured to store the private key associated with the workload within a secure execution environment based at least in part on the allocated resources including the secure execution environment within the TPM of the host device.

14. The system of claim 10, wherein:
the host device is further configured to generate a secure execution environment for the VM within the TPM of the host device based at least in part on receiving the identifier of the workload; and
the VM is further configured to determine, within the secure execution environment, a private key associated with the workload based at least in part on the identifier of the workload, wherein the request for the certificate further comprises the private key.

15. The system of claim 14, wherein the VM is further configured to generate, within the secure execution environment for the VM, the private key associated with the workload, wherein determining the private key is based at least in part on the generating.

16. The system of claim 14, wherein the HSM is further configured to transmit an error message to the VM in response to receiving the request for the certificate based at least in part on one or more parameters within the request for the certificate.

17. The system of claim 10, wherein:
the host device and the HSM are configured to establish a secure association between the TPM and the HSM based at least in part on a public key associated with the HSM and a private key associated with the HSM; and
the VM is configured to establish a secure association between the VM and the HSM based at least in part on the secure association between the TPM and the HSM, wherein communicating the request for the certificate is based at least in part on the secure association between the VM and the HSM.

18. A method, comprising:
receiving, at a host device from an orchestrator of a computer network environment, an indication a workload to be executed by a virtual machine (VM) hosted on the host device, the indication comprising an identifier of the workload;
establishing a secure association between a hardware security module (HSM) and the VM based at least in part on authenticating the HSM using a public key associated with the HSM and known by the host device;
transmitting, from the VM to the HSM and based at least in part on establishing the secure association between the HSM and the VM, a request for a certificate to authenticate communication associated with the workload to be executed by the VM, wherein the request comprises the identifier of the workload; and
receiving, from the HSM, the requested certificate comprising a public key associated with the workload and a private key associated with the workload.

19. The method of claim 18, further comprising:
transmitting a parameter to the HSM indicating, to the HSM, to determine the private key associated with the workload, wherein receiving the private key associated with the workload is based at least in part on transmitting the parameter to the HSM.

20. The method of claim 19, further comprising:
generating a secure execution environment for the VM within a trusted platform module (TPM) of the host device based at least in part on receiving the identifier of the workload and prior to transmitting the request for the certificate; and
storing the private key associated with the workload at the secure execution environment.

21. The method of claim 18, further comprising:
establishing the secure association between the VM and the HSM based at least in part on a secure association between a trusted platform module (TPM) of the host device and the HSM.

* * * * *